Nov. 9, 1965   G. HEYEK   3,216,286
DRY SHAVERS
Filed May 21, 1962

INVENTOR
Gerhard Heyek

BY
Watson Cole Grindle + Watson
ATTORNEYS

United States Patent Office 3,216,286
Patented Nov. 9, 1965

3,216,286
DRY SHAVERS
Gerhard Heyek, Graz, Styria, Austria, assignor to Carinthia - Elektrogeräte Gesellschaft m.b.H., Klagenfurt, Carinthia, Austria
Filed May 21, 1962, Ser. No. 196,109
Claims priority, application Austria, June 16, 1961, A 4,698/61
1 Claim. (Cl. 76—101)

This invention relates to a method for producing shear foils for dry shavers.

It is an object of the invention to provide a method to produce a metal foil by providing an operating face of a punch with a number of spaced raised parts to punch out the material from the foil to form recesses therein and then the recesses as to the edges thereof are bent to form flanges. The edges are subsequently ground.

Other objects will be apparent from the following description when considered in connection with the accompanying drawing in which.

As is known, shearing foils for dry shavers are produced from thin hard steel plates by punching out holes, for example slits, in the foil enabling the hairs to pass through, the holes being formed with sharp edges which produce the shaving action in co-operation with a moving cutter.

Figure 1:
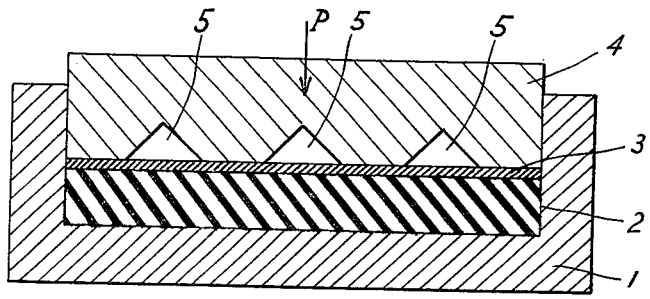
FIG. 1 is a cross section of a known punching device.
Figure 2:
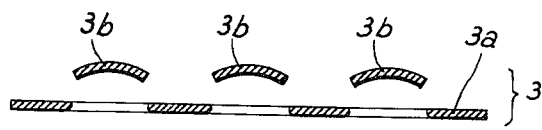
FIG. 2 is a cross section of the punched steel foil made in the apparatus of FIG. 1.

For the production of such punched shearing foils a device is already known see (Austrian patent specification No. 199,463) in which a rubber pad closed in an all sides co-operates with a punch having recesses corresponding to the holes to be produced in the shearing foil, the recesses having walls running together at an included angle of 45° to 90°. For a better understanding of the invention, the punching process carried out with this known device will first be described with reference to FIGURES 1 and 2. FIGURE 1 shows the known punching device in simplified form. In a cavity in a die 1 there is a rubber pad 2 on which the sheet steel foil 3 to be punched is placed. A metal punch 4 is formed with an operating face including recesses 5 having sloping walls running together, the recesses being for example, shaped or conical. The shapes of the mouths of these recesses, and the arrangement of the recesses, correspond to the desired shape and size of the holes to be punched and to the desired arrangement of these holes. The punch 4 is pressed against the sheet steel foil 3 and the rubber pad 2 in the direction of the arrow P, whereby the rubber pad enclosed on all sides forces the sheet foil 3 in places into the recesses in the punch, so that the parts 3b of this foil which are to be punched out, as shown in FIGURE 2, are shorn off and pass into the recesses in the punch. This process produces a flat shear foil 3a with holes having sloping side walls, the foil close to the holes being slightly rounded off on the one side facing the rubber pad.

According to the present invention the operating face of the punch is formed with a number of spaced raised parts which punch out material from the foil to form holes, the recessed part between the raised parts being in the shape of the desired shearing foil, the raised parts being tapered as viewed in cross-section so that the pressure of the pad on the parts of the foil entering the recesses causes the edges of those parts of the foil to be bent away from the remainder of the foil so as to form flanges, the edges of these flanges being subsequently ground and lapped so that they are parallel to the main faces of the shearing foil.

An example of a method of manufacture according to this invention will be described more fully with reference to FIGURES 3 and 4 of the drawings.

Figure 3:
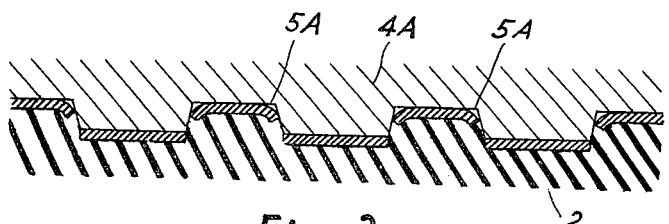
FIG. 3 is a cross section showing the punching device according to the invention.
Figure 4:
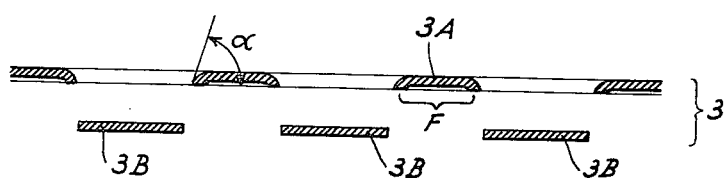
FIG. 4 is a cross section of the punched steel foil.

FIGURE 3 shows the punch, the shearing foil and the pad, and FIGURE 4 shows, similarly to FIGURE 2, a shearing foil produced in accordance with the invention, and the waste obtained in the punching process.

The punch 4A designed in accordance with the invention has in its operating face a number of recesses 5A having flat or slightly arched bases and having a taper as seen in cross-section. The recesses form as a whole a network of which the shape substantially resembles the form of the desired finished shearing foil. The raised parts of the punch left between these recesses therefore correspond in form and arrangement to the form and arrangement of the desired holes in the shearing foil. Thus the contours of the recesses in the punch according to the invention as shown in FIGURE 3 are to the contours of the recesses in the known punch according to FIGURE 1 as a positive to a negative. When the punch 4A is pressed against the rubber pad 2, the desired holes are punched out by the raised parts of the punch, the waste products 3B remaining substantially flat, while the bridge parts of the shearing foil 3A which are produced between the holes are forced into the recesses in the punch 4A until they rest against the bases of the recesses. In this process the edges of the bridge parts are bent over to form flanges at a slope following the sloping walls of the recesses in the punch. The edges of the flanges are then ground and lapped so as to lie in a surface F extending parallel to the main surfaces of the foil (as shown in FIG. 4), whereby sharp cutting edges are produced. The bending over of the edges of the bridge parts is intended to take place in such a way that a cutting angle $a$ of about 70° is obtained.

The bridge parts between the holes of a shearing foil according to the invention are not flat but profiled as seen in cross-section, whereby their resistance to bending is increased in a desirable manner, so that during shaving the bridge parts have less tendency to lift away from the moving cutter due to bending. Moreover the cutting edges are re-ground more satisfactorily in operation. As the shearing foil rests against the cutter only at the edges of the flanges, it will not be lifted away by dust particles or grains of sand which have penetrated into the hollow spaces formed between the flanges. Finally, skin grease can accumulate in those hollow spaces, whereby substantially less wear results in continuous service owing to reduced friction.

I claim:

A method of making a shearing foil for a dry shaver comprising punching holes in a metal foil by means of a punch acting on the foil while the foil is supported by a deformable pad enclosed on all sides, the operating face of the punch being formed with a number of spaced raised parts which punch out material from the foil to form holes, the recessed part between the raised parts being flat and in the shape of the desired perforated shearing foil, the raised parts being tapered as viewed in cross-section so that the pressure of the pad on the parts of the foil entering the recesses causes the edges of those parts of the foil to be bent away from the remainder of the foil so as to form flanges, and subsequently grinding and lapping the edges of the flanges so that they are parallel to the main faces of the shearing foil.

References Cited by the Examiner

UNITED STATES PATENTS

| | | | |
|---|---|---|---|
| 2,133,445 | 10/38 | Guerin | 113—44 XR |
| 2,182,067 | 12/39 | Bruecker | 76—104 |
| 2,735,390 | 2/56 | Engel | 76—107 |
| 2,847,048 | 8/58 | Gildersleeve | 76—101 |
| 3,064,349 | 11/62 | Futterer et al. | 30—46.8 XR |

FOREIGN PATENTS 199,463    9/58    Austria.

GRANVILLE Y. CUSTER, JR., *Primary Examiner.*

FRANK H. BRONAUGH, *Examiner.*